(12) United States Patent
Gokturk et al.

(10) Patent No.: US 8,898,169 B2
(45) Date of Patent: Nov. 25, 2014

(54) AUTOMATED PRODUCT ATTRIBUTE SELECTION

(75) Inventors: Salih B. Gokturk, Zurich (CH); Wei Zhang, Fremont, CA (US); Emilio Rodriguez Antunez, III, Mountain View, CA (US); Baris Sumengen, New York, NY (US)

(73) Assignee: Google Inc., Mountain View, CA (US)

( * ) Notice: Subject to any disclaimer, the term of this patent is extended or adjusted under 35 U.S.C. 154(b) by 3 days.

(21) Appl. No.: 13/292,852

(22) Filed: Nov. 9, 2011

(65) Prior Publication Data

US 2012/0117072 A1  May 10, 2012

Related U.S. Application Data

(60) Provisional application No. 61/456,695, filed on Nov. 10, 2010.

(51) Int. Cl.
*G06F 17/30* (2006.01)
*G06Q 30/02* (2012.01)

(52) U.S. Cl.
CPC ...... *G06F 17/30873* (2013.01); *G06Q 30/0278* (2013.01)
USPC ..................................................... 707/740

(58) Field of Classification Search
CPC .......... G06Q 30/0601; G06Q 30/0603; G06Q 30/0641
USPC .......................................... 707/736, 737, 740
See application file for complete search history.

(56) References Cited

U.S. PATENT DOCUMENTS

| | | | |
|---|---|---|---|
| 5,313,267 A | 5/1994 | MacFarlane et al. | |
| 6,525,663 B2 | 2/2003 | Colmenarez et al. | |
| 6,882,897 B1 | 4/2005 | Fernandez | |
| 7,043,492 B1 * | 5/2006 | Neal et al. | 341/87 |
| 8,068,676 B2 | 11/2011 | Zhang et al. | |
| 2003/0217052 A1 * | 11/2003 | Rubenczyk et al. | 707/3 |
| 2008/0082426 A1 * | 4/2008 | Gokturk et al. | 705/27 |
| 2008/0126962 A1 | 5/2008 | Cook | |
| 2008/0144943 A1 | 6/2008 | Gokturk et al. | |
| 2008/0152231 A1 | 6/2008 | Gokturk et al. | |
| 2008/0177640 A1 | 7/2008 | Gokturk et al. | |
| 2008/0212899 A1 | 9/2008 | Gokturk et al. | |
| 2009/0063471 A1 * | 3/2009 | Erickson | 707/5 |

OTHER PUBLICATIONS

Hsu et al., "Clothing Image Retrieval for Smarter Shopping," EE368, Spring 2011, Department of Electrical Engineering, Stanford University, 6 pages.

(Continued)

*Primary Examiner* — Khanh Pham
(74) *Attorney, Agent, or Firm* — Fish & Richardson P.C.

(57) ABSTRACT

Product data for a product is received by an attribute selection module. The product data includes product image data and product text data. This product data is used to generate a plurality of probability distributions for a category. The category includes a plurality of attributes, and the probability distribution includes a plurality of probabilities indicating the likelihoods that attributes of the category are applicable to the product. The plurality of probability distributions for the category are weighted and summed to generate a combined probability distribution for the category. An attribute label is determined by selecting an attribute from the category that is indicated to be most likely applicable to the product based on the combined probability distribution for the category. The attribute label is associated with the product. The attribute label enables other services to search for and retrieve the product based on the attribute.

24 Claims, 8 Drawing Sheets

(56) References Cited

OTHER PUBLICATIONS

Bay, H., et al., "Speeded-Up Robust Features (SURF)," Computer Vision and Image Understanding, 2008, pp. 346-359, vol. 110.
Bosch, A., et al., "Representing Shape With a Spatial Pyramid Kernel," Proceedings of the 6th ACM international conference on Image and video retrieval, CIVR'07, Jul. 9-11, 2007, pp. 401-408.
Berg, T., et al., "Automatic Attribute Discovery and Characterization from Noisy Web Data," 11th European Conference on Computer Vision, Lecture Notes in Computer Science Part I, 2010, pp. 663-676.
Dalal, N., et al., "Histograms of Oriented Gradients for Human Detection," Proceedings of the 2005 IEEE Computer Society Conference on Computer Vision and Pattern Recognition (CCPR'05), 2005, pp. 886-893.
Ferrari, V., et al., "Learning Visual Attributes," Proceeding of Advances in Neural Information Processing Systems, 2007, 7 Pages.
Liu, J., et al., Smart Shopper: An Agent-Based Web-Mining Approach to Internet Shopping, IEEE Transactions on Fuzzy Systems, Apr. 2003, pp. 226-237, vol. 11, No. 2.
Tseng, C.-H., et al., "An efficient garment visual search based on shape context," WSEAS Transactions on Computers, Jul. 2009, pp. 1195-1204, vol. 8, Issue 7.
Zhang, W., et al., "Asynchronous Reflections: Theory and Practice in the Design of Multimedia Mirror Systems," Multimedia Systems Journal, May 18, 2010, pp. 293-307, vol. 16, Springer.
Zhang, W., "Image Features and Learning Algorithms for Biological, Generic and Social Object Recognition," A Dissertation submitted to Oregon State University, Mar. 16, 2009, 155 Pages.

* cited by examiner

AUTOMATED PRODUCT ATTRIBUTE SELECTION

CROSS-REFERENCE TO RELATED APPLICATIONS

This application claims the benefit of U.S. Provisional Application No. 61/456,695, filed Nov. 10, 2010, which is incorporated by reference herein.

BACKGROUND

1. Field of Disclosure

This disclosure generally relates to the field of automated text and image classification, and specifically relates to automatic attribute labeling of products.

2. Description of the Related Art

The Internet is now widely used by consumers for browsing and purchasing products of various types. Consumers often wish to browse products that have a particular attribute (e.g. shoes with high-heels), and service providers—such as product retailers and search engines—have an incentive to provide users with links to products that possess the attributes that they desire. When a consumer requests products with a particular attribute from a service provider, the service provider often retrieves links to these products based on matching the consumer's text query to product data (such as image labels and product descriptions) associated with the product. Unfortunately, for many products this data is missing, inaccurate, uninformative, or incomplete. As a result, when a consumer makes a request for products having a particular attribute, many products that do have the attribute in reality, but do not have a text label for that attribute, may be missed by the service provider, and may not be provided to the requesting consumer.

SUMMARY

The above and other needs are met by a computer-implemented method, a computer system, and a non-transitory computer-readable storage medium storing executable code for determining an attribute label for a product.

One embodiment of the computer-implemented method comprises receiving product data for the product, the product data comprising product image data and product text data. This product data is used to generate a plurality of probability distributions for a category. The category comprises a plurality of attributes, and the probability distribution comprises a plurality of probabilities indicating the likelihoods that attributes of the category are applicable to the product. The plurality of probability distributions for the category are weighted and summed to generate a combined probability distribution for the category. An attribute label is determined by selecting an attribute from the category that is indicated to be most likely applicable to the product based on the combined probability distribution for the category. The determined attribute label is associated with the product. The attribute label enables other services to search for and retrieve the product based on the attribute.

One embodiment of a non-transitory computer-readable storage medium storing executable computer program instructions for determining an attribute label for a product comprises code that when executed performs steps for receiving product data for the product, the product data comprising product image data and product text data. The steps further including generating a plurality of probability distributions for a category based on the product data, the category comprising a plurality of attributes, a probability distribution comprising a plurality of probabilities indicating likelihoods that attributes of the category are applicable to the product. The steps also including generating a combined probability distribution for the category based on a weighted sum of the plurality of probability distributions for the category, and determining the attribute label by selecting an attribute from the category that is indicated to be most likely applicable to the product based on the combined probability distribution. An additional step associates the determined attribute label with the product.

One embodiment of a computer system for determining an attribute label for a product comprises a computer processor configured to execute instructions performing steps for receiving product data for the product, the product data comprising product image data and product text data. The steps further including generating a plurality of probability distributions for a category based on the product data, the category comprising a plurality of attributes, a probability distribution comprising a plurality of probabilities indicating likelihoods that attributes of the category are applicable to the product. The steps also including generating a combined probability distribution for the category based on a weighted sum of the plurality of probability distributions for the category, and determining the attribute label by selecting an attribute from the category that is indicated to be most likely applicable to the product based on the combined probability distribution. An additional step associates the determined attribute label with the product.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Overview

Figure 1:
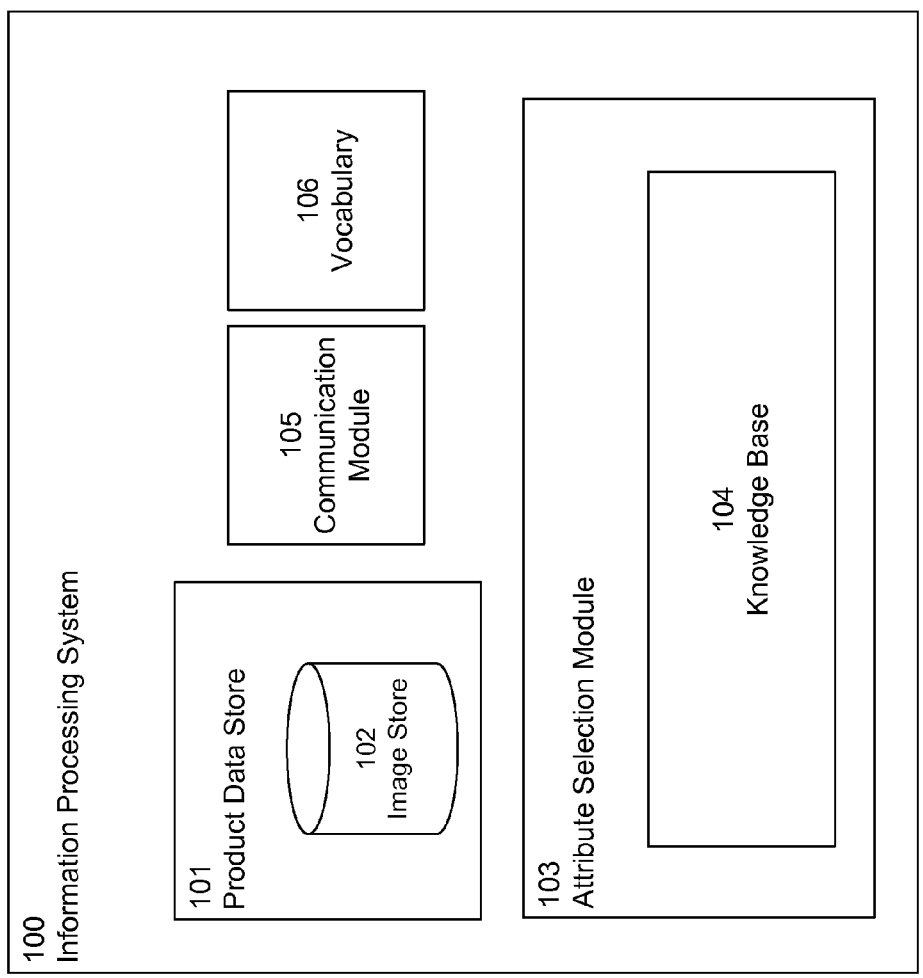
FIG. 1 is a high-level block diagram of an information processing system configured to select and assign product attributes based on product data, including image data.

FIG. 1 is a high-level block diagram of an information processing system 100 configured to select attributes for a product based on image data and text data associated with the product, according to one embodiment of the present disclosure. The attributes correspond to real-world descriptive traits of the product, which may be relevant to consumers. Once the product is labeled with the selected attributes this information may be used to improve downstream services. For example, these attributes may enable other systems, such as search systems and retail systems, to retrieve relevant products based on queries containing attributes. For instance, a product that is a women's dress may be labeled with the attributes "sleeveless" and "mid-length" based on the processing of the product's data done by the information processing system 100. When a consumer requests a list of women's dresses that are sleeveless and mid-length, the labeled product can be provided along with other products that are labeled with similar attributes.

The information processing system 100 includes product data store 101, image store 102, attribute selection module 103, knowledge base 104, communication module 105, and vocabulary 106. In one embodiment, the components 101, 102, 103, 104, 105 and 106 are implemented on a single computer system. In another embodiment, these components are implemented on two or more computer systems connected through a local network (e.g. as an application running in a data center) or a wide area network such as the Internet (e.g. implemented on a cloud computing service).

The vocabulary 106 is conceptually the corpus from which the product attributes are selected. The vocabulary 106 includes one or more categories, with each category comprising a plurality of attributes. The attributes correspond to descriptive concepts that may be associated with a product. For example, if the product is a shoe, two attributes that might apply to it may be "high heel" and "square toe". The categories represent mutually exclusive sets of attributes that describe variations of the same product feature. For example, there may be a category associated with shoe heel types, and this category may have attributes associated with it such as, "high heel", "low heel", "flat", and "mid heel". For a given shoe product only one attribute of this category will be applicable. In other words, a shoe that is "high heel" cannot also be "low heel", etc. Not all categories will apply to every product or product type. For example the shoe heel category above will not apply to products that are women's dresses. Different product types may have different sets of categories that are applicable to them, but some categories may be applicable to multiple product types.

The product data store 101 is a store of the product information collected by, or provided to, the information processing system 100. This information may reside on the same computing system as the rest of the information processing system 100, or the product data store 101 may be hosted by one or more remote systems, for e.g. on the Internet-connected servers of web retailers. The product data store 101 may consist of a single archive or database, or it may be distributed across many systems and databases. The product data store 101 may store both image data and text data. In some embodiments it may even store video data and sound data related to a product. The text data associated with a product may include the product title or name, text descriptions of the product, text reviews of the product, etc. The image store 102 is conceptually the storage for the image data associated with products. The image data may include photographs of the product from catalogues, advertising photos, review photos, etc. The product data, including both image data and text data, may be physically stored by the information processing system 100, or it may be accessible to the information processing system 100 but stored on external servers including third party servers.

The attribute selection module 103 receives product data (including image data and text data) for a product from the information processing system 100, or from an external server, and selects attributes from the vocabulary 106 that are applicable to that product, using machine-learning, regular expressions, and other techniques. For example, the attribute selection module 103 may receive product data for a shoe that includes an image of the shoe and a text description for the shoe. Based on the image and the text description, the attribute selection module 103 may select the attributes "high heel" and "open toe" for the shoe. The attributes selected by the attribute selection module 103 may be used to label the products stored in the product data store 101, or they may be provided to external services such as search services or retail services, so that such services can label products in their own data stores.

The knowledge base 104 provides the attribute selection module 103 with data sets, machine-learned classifiers, rules, and heuristics that are used for attribute selection. For example, the knowledge base 104 may provide regular expressions that can be used by the attribute selection module 103 to select attributes based on text descriptions. Similarly, the knowledge base 104 may provide machine-learned classifiers that can select product attributes based on shape features extracted from a product image. The knowledge base 104 and the attribute selection process are described in more detail herein.

The communication module 105 facilitates communication between the various modules of the information processing system 100, as well as communication between the information processing system 100 and external servers. The communication module 105 may communicate the attributes selected by the attribute selection module 103 to third party computer systems. The communication module 105 may also receive communication from external servers, including image data, text data, heuristics, training data, rules, regular expressions, etc.

Hardware Environment

Figure 2:
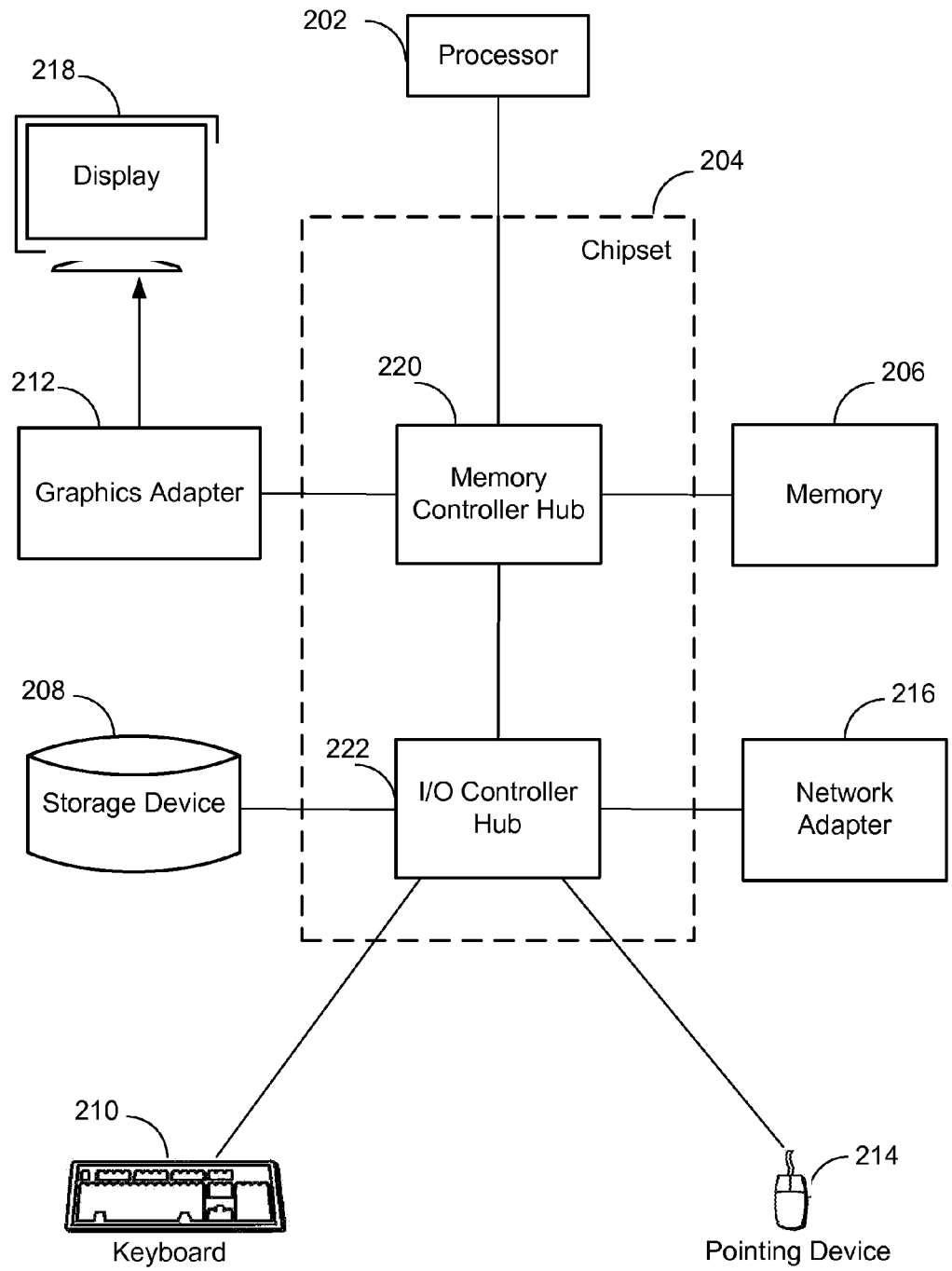
FIG. 2 is a high-level block diagram illustrating an example computer.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the information processing system 100 might comprise multiple blade servers working together to provide the functionality described herein. The computers 200 can lack some of the components described above, such as keyboards 210, graphics adapters 212, and displays 218. In addition, the information processing system 100 can run in a single computer 200 or multiple computers 200 communicating with each other through a network such as in a server farm.

Attribute Selection Module

Figure 3:
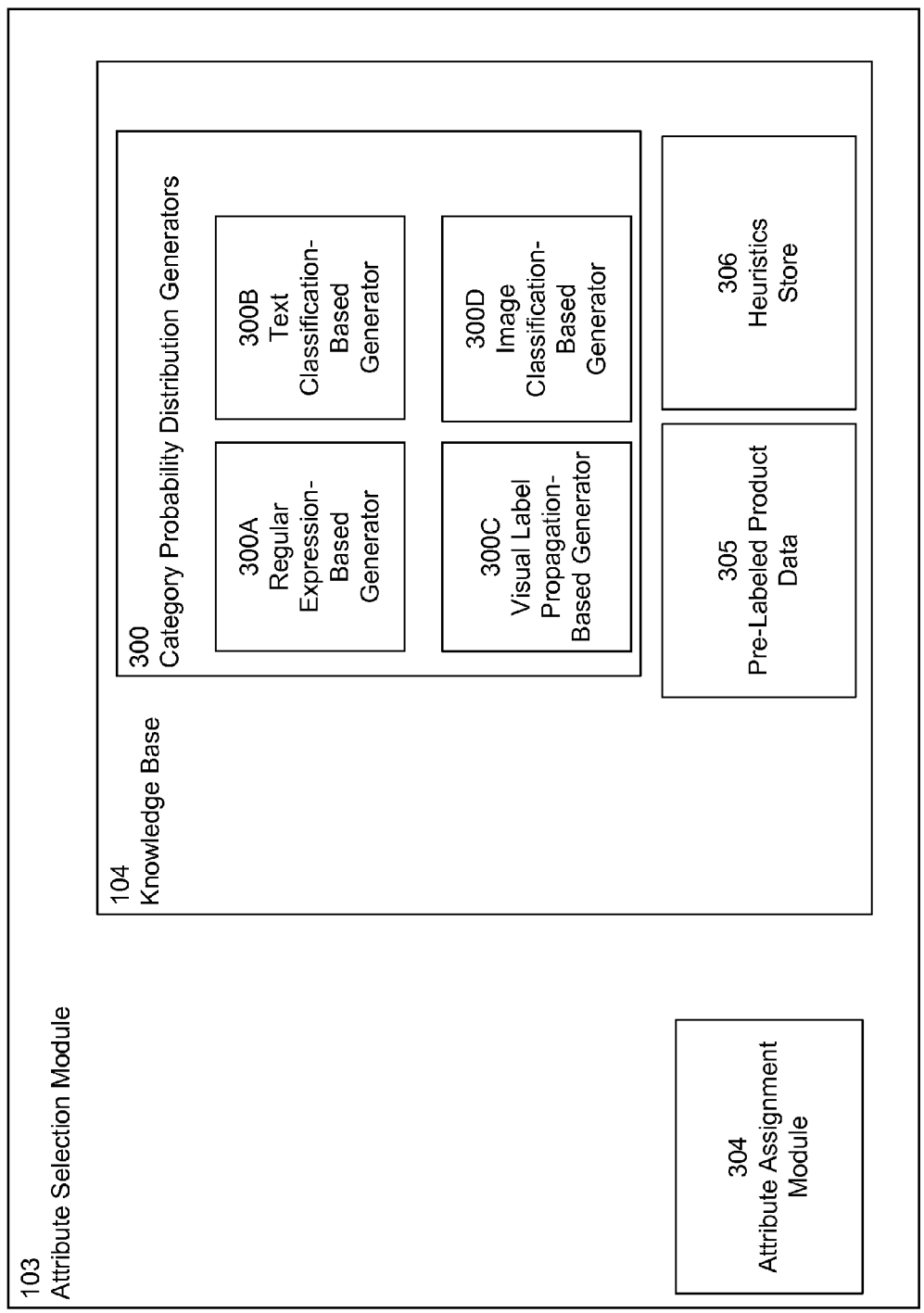
FIG. 3 is a high-level block diagram illustrating a detailed view of modules within the attribute selection module according to one embodiment.

FIG. 3 is a high-level block diagram illustrating a detailed view of modules within the attribute selection module 103 according to one embodiment. Some embodiments of the attribute selection module 103 have different and/or other modules than the ones described herein. Similarly, the functions can be distributed among the modules in a different manner than is described here. In addition, each module in FIG. 3 may be implemented by a set of computers operating in parallel to further improve efficiency. As illustrated, the attribute selection module 103 includes the knowledge base 104 and an attribute assignment module 304.

The knowledge base 104 includes category probability distribution generators 300, pre-labeled product data 305, and heuristics store 306. The heuristics store 306 stores a collection of techniques (including modules for implementing algorithms, rules, filters, programs, scripts, etc.) that are applicable in various stages of the attribute selection process, and that have been formulated based on observation, experiment, or human experience, or that have been established in the knowledge base 104 through interface with systems outside the attribute selection module 103. An example of a heuristic is a rule that determines that the region of an image of a shoe that contains the ankle of the shoe is the region above the region that contains the heel of the shoe. Another heuristic is one that determines the location of the heel of the shoe based on the presence of a specific set of shape features. These rules may be formulated based on the observations of human experimenters, or they may be collected based on the operation of machine-learned systems operating on image stores. A heuristic is generally applicable in one context of the attribute selection process, but some heuristics are applicable in a number of different stages of the process.

The category probability distribution generators 300 are modules that are capable of generating probability distributions for categories based on various product-related information such as the product information stored in the product data store 101. A probability distribution for a category—also called a category probability distribution—is a distribution of probabilities across all the attributes in a category as they apply to a product. In other words, for each attribute in a category, the distribution indicates the probability that attribute is applicable to the product. For example, for shoes there may be a category that corresponds to the shoe toe type, where the attributes in the category are "open toe", "pointy toe", "round toe", and "square toe". A category probability distribution generator may take the product information for a particular shoe and generate the probabilities [0.25, 0.5, 0.0, 0.25] based on an image of the shoe. This probability distribution indicates that there is a (predicted) 25% chance that the shoe has an open toe, a 50% chance that the shoe has a pointy toe, a 0% chance that the shoe has a round toe, and a 25% chance that the shoe has a square toe.

The category probability distributions may be generated using different techniques. In one embodiment the category probability distribution generators 300 include regular expression-based generator 300A, text classification-based generator 300B, visual label propagation-based generator 300C, and image classification-based generator 300D. Each of these generator types has different accuracies for different attribute categories and product types. For example, the image classification-based generator can generate accurate probability distributions for the "shoe heel height" category (e.g., high heel vs. flat). But this generator is much less accurate when applied to the "dress neck type" category (e.g., round neck vs. square neck). For the "dress neck type" category the text classification-based generator usually generates more accurate probability distributions.

The separate category probability distributions generated by different techniques, for an unlabeled product, are weighted and combined by the attribute assignment module 304 to determine a single attribute that is applicable to the product, in each category. The attribute selection module 103 may output these determined attributes as "selected attributes" or "labels" for the unlabeled product. Such selected attributes or labels may be utilized by downstream services to improve search, retail, and browsing activities for users. By using a weighted combination of category probability distributions, the attribute selection module 103 can overcome the inaccuracies of individual category probability distribution generators 300.

Figure 4:
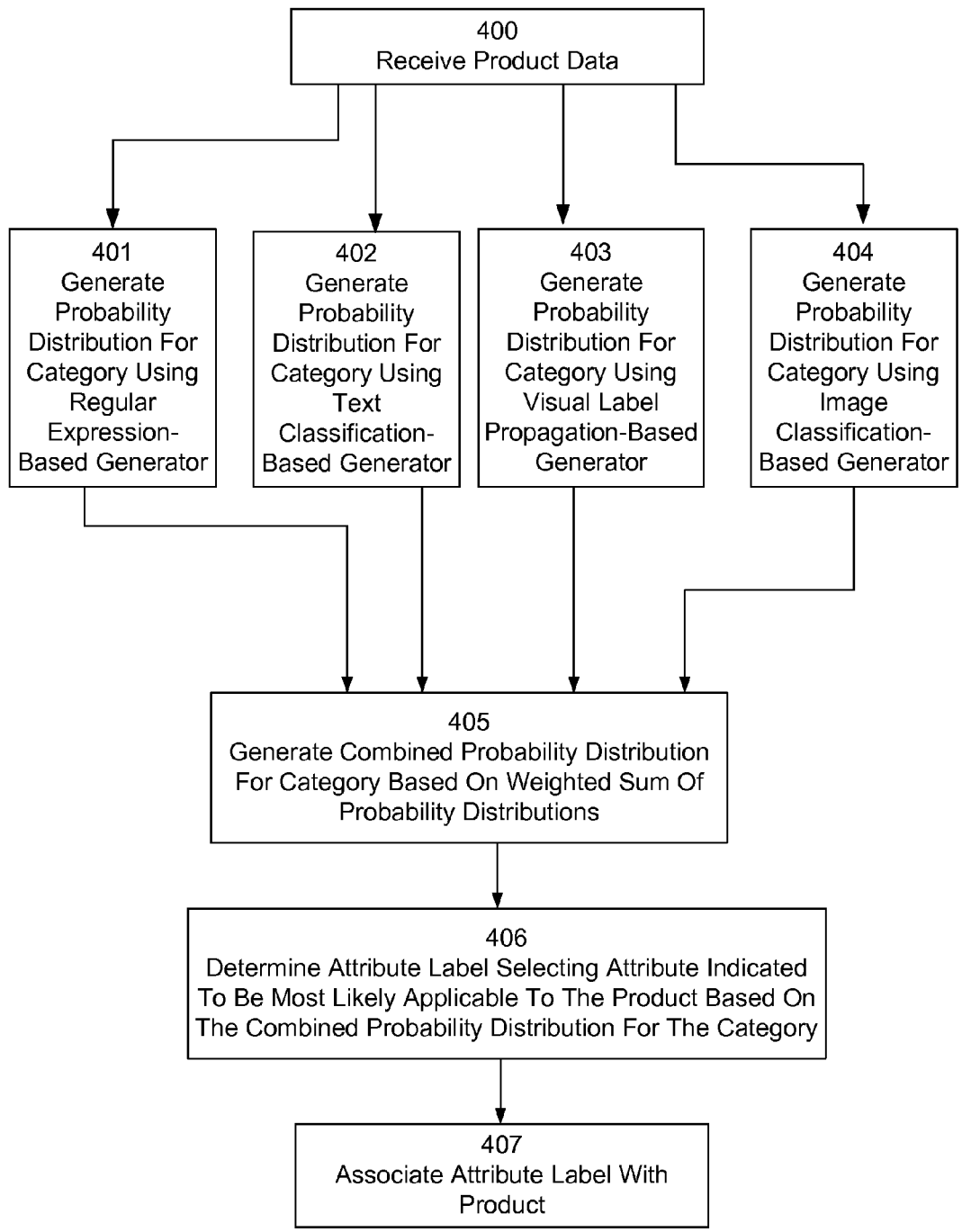
FIG. 4 is a flow chart illustrating the operation of the attribute selection module according to one embodiment.

FIG. 4 illustrates one embodiment of a process used by the attribute assignment module 304 to select an attribute label for a product. In this embodiment, in the first step, product data is received 400 by the system. However, in other embodiments the product data may be generated by the system. In one embodiment, the received product data may indicate a product type that can be used to determine a category that is applicable to the product. In another embodiment, the applicable category may be determined based on the application of text processing techniques such as regular expressions, text classifiers etc. to the text data included in the product data. For example, based on the word "shoe" appearing in the text data, the system may select the "shoe toe type" category as being applicable to the product. The system may determine that multiple categories are applicable to the product, in which case subsequent steps may be repeated to select an attribute label from each applicable category.

Once an applicable category is identified, probability distributions for the category are generated 401, 402, 403, 404 by four different generators. These category probability distributions are weighted and summed to generate 405 a combined probability distribution for the category. The weight assigned to a category probability distribution generated by a specific generator may be determined in different ways. In one embodiment the weight assigned to a category probability distribution is determined by the accuracy of the corresponding generator, as determined by testing the results of the generator against the pre-labeled product data 305. The pre-labeled product data 305 includes image data and text data related to products that are labeled with attributes by human fashion experts. The pre-labeled product data 305 may be constructed by presenting fashion experts with photos and text data related to products, and asking them to choose attributes from one or more categories to apply to the products based on that information. The accuracy of a category probability distribution generator may be determined by having it generate a category probability distribution for a pre-labeled product, and comparing this distribution to the label (attribute) assigned by the human experts. Each generator may have different weighting for each category and/or product type. In this way category probability distribution generators may be weighted more highly for product types and categories for which they are more accurate.

The attribute assignment module 304 takes the combined probability distribution for the category and determines 406 an attribute label based on the attribute that is most probable in the combined probability distribution. The most probable attribute in the combined probability distribution for the category is the attribute that has the largest value in the combined distribution. For example, take an unlabeled shoe product for which the attribute selection module 103 is selecting a label in the "shoe toe type" category described earlier. This category has four possible attributes (i.e. labels) that correspond to "open toe", "pointy toe", "round toe", or "square toe". Each of the four generator types will generate (401, 402, 403, and 404) a category probability distribution for these attributes. In this example assume the distributions generated are [0.0, 1.0, 0.0, 0.0], [0.0, 1.0, 0.0, 0.0], [0.25, 0.5, 0.0, 0.25], and [0.1, 0.5, 0.0, 0.4]. Assume also that previous testing has determined that the accuracy of the regular expression-based generator is the highest for this product type and category (90% accurate), and that the other generators are only 50% accurate, and therefore the weights associated with these generators are 0.9, 0.5, 0.5, and 0.5. After weighting the distributions are then [0.0, 0.9, 0.0, 0.0], [0.0, 0.5, 0.0, 0.0], [0.125, 0.25, 0.0, 0.125], and [0.05, 0.25, 0.0, 0.2]. After adding these together the weighted sum is [0.175, 1.9, 0.0, 0.325]. The attribute with the largest value is the second one (1.9), which corresponds to "pointy toe". This is the attribute that most probably applies to the unlabeled shoe product.

Once an attribute label is determined, this attribute label may be associated 407 with the product. Association may be through creating a reference in a database from the attribute to the product, or vice versa, or it may be through any other mechanism that allows the product to be retrieved through the attribute label, or the attribute label through the product. In the above example, the "pointy toe" attribute is the attribute label that may be assigned or associated with the shoe product and provided to other services. Subsequently if a user searches for "pointy toe shoe" this product may be displayed to them on the basis of the attribute. In one embodiment, the attribute label is associated with the product by providing the attribute label to an external system or service that performs the associative function.

The values in the weighted sum of category probability distributions are no longer in the range 0.0 to 1.0 so they cannot be used as a predictor of the accuracy of the attribute directly. If a downstream system requires a measure of the confidence or accuracy of the assigned attribute (in this case "pointy toe") the values in the weighted sum may be normalized, and the resulting normalized value may be used as an estimate of the label accuracy (attribute accuracy). In this instance normalizing the weighted sum [0.175, 1.9, 0.0, 0.325] results in [0.07, 0.79, 0.0, 0.14], therefore the "pointy toe" attribute selected by the system is estimated to be 79% accurate for this shoe product.

Category Probability Distribution Generators

As described above, the category probability distributions may be generated using different techniques, and it is the weighted sum of these distributions that determines the final label in a category that is selected for a product. In one embodiment the category probability distribution generators 300 include regular expression-based generator 300A, text classification-based generator 300B, visual label propagation-based generator 300C, and image classification-based generator 300D.

The regular expression-based generator 300A generates category probability distributions by applying regular expression rules to the text data associated with a product. The regular expression-based generator 300A may have a separate regular expression rule for each attribute in each category of the vocabulary. The regular expression rule for an attribute takes text data as input and returns either a 1.0 (100%) or 0.0 (0%) based on whether that attribute applies to the product. For example, based on the phrase "below the knee" that appears in a product description for a women's dress, a regular expression rule may return 1.0 for an attribute "mid-length" in a category that corresponds to dress length. The regular expression-based generator 300A generates a probability distribution for a category that has only a single non-zero probability attribute. In the above example, the probability distribution for the dress length category that contains the attributes, "maxi", "mid-length", and "mini", may be [0.0, 1.0, 0.0], which corresponds to the prediction that it is 100% likely that the dress is mid-length based on the phrase "below the knee" appearing in the product description.

Figures 5A, 5B:
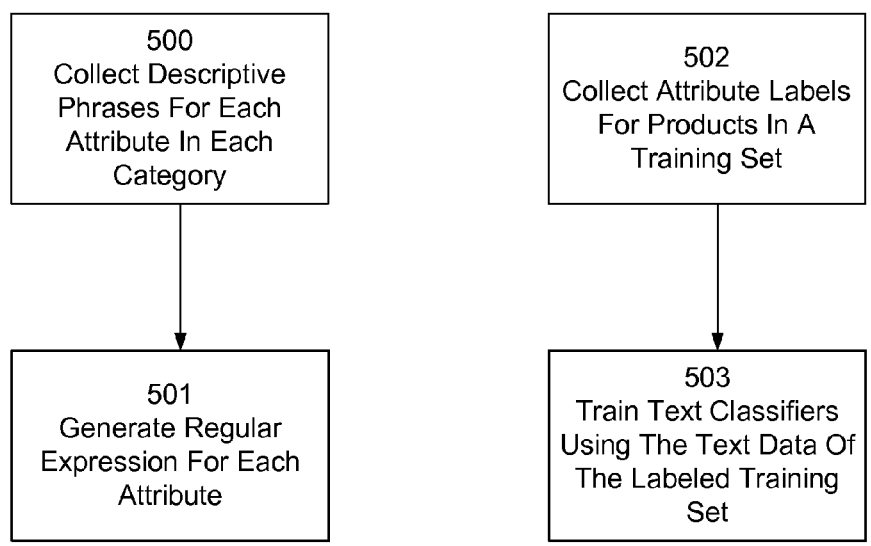
FIGS. 5A and 5B are flow charts illustrating the pre-processing done by the regular expression-based generator and the text classification-based generator according to one embodiment.

FIG. 5A illustrates one embodiment of the process for generating the regular expression rules used by the regular expression-based generator 300A. In a first step, descriptive phrases for each attribute in a category are collected 500 from human fashion experts. Next, the descriptive phrases are used to generate 501 regular expression rules either through automated or manual processes, for each attribute. For example, for the dress length category the "maxi dress" attribute may be assigned the rule: maxi|maxi dress(es)|full dress(es) |gown|long dress(es)|wedding dress(es). Application of this rule will result in, for example, an output of 1.0 whenever the words, "maxi", "gown", "long dress", "wedding dress", etc. appear in the text data for a product.

The text classification-based generator 300B generates category probability distributions for a product by employing machine-learned classifiers, such as support vector machines (SVMs), and using the text data in the product's data as input. The classifiers used may be bag-of-words classifiers, hierarchies of multiple classifier types, or any other machine-learned technique for text processing. These classifiers may be trained using the pre-labeled product data 305. There may be a separate classifier for each category that takes the text data as input and generates a probability distribution for that category as output.

FIG. 5B illustrates one embodiment of the process for training text classifiers used by the text classification-based generator 300B. In a first step, human fashion experts examine product data associated with a set of products, and based on this data select attributes for the products, which are collected 502 into a labeled training set. The text data from this labeled training set is used to train 503 one or more machine-learned text classifiers for each category in the vocabulary 106. These text classifiers can then be used to generate category probability distributions for a product based on the product's text data.

Figure 6:
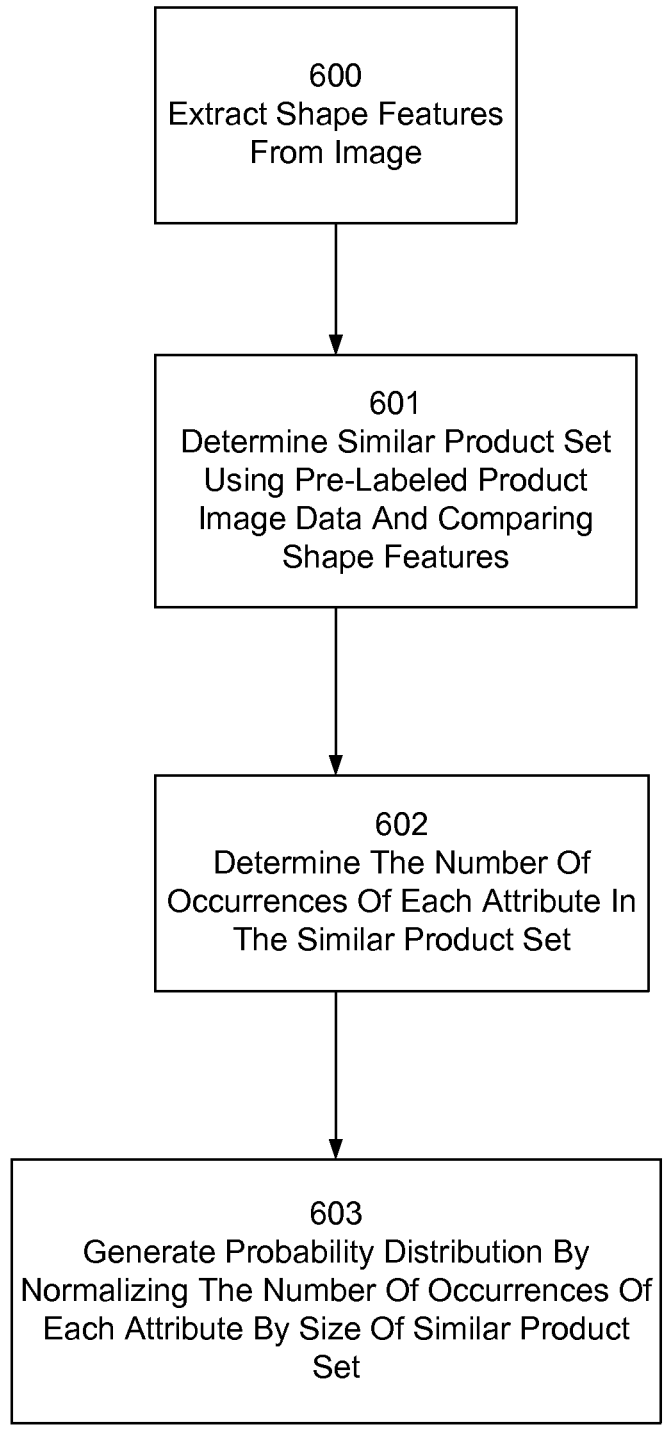
FIG. 6 is a flow chart illustrating the operation of the visual label propagation-based generator according to one embodiment.

The visual label propagation-based generator 300C generates category probability distributions based on the similarity of image data associated with the product to image data associated with pre-labeled products. FIG. 6 illustrates one embodiment of a process used by the visual label propagation-based generator 300C to generate a probability distribution for a category. The visual label propagation-based generator 300C first extracts 600 shape features from an image of the product. For example, the process may extract simple global shape descriptors from the image, based on the orientation of edge points, in a manner similar to the histogram of orientation gradients (HOG) features described by Dalal and Triggs in *Histograms of Oriented Gradients for Human Detection* (CVPR, 2005). These shape features are compared to shape features extracted from the images in the pre-labeled product data 305. Based on a comparison of the shape features of the product image and the shape features of the pre-labeled product images, the system determines 601 a similar product set that consists of products that have image data that is visually similar to the product image. The system then determines 602 the number of occurrences of each attribute in the category in the similar product set. Next the system generates 603 the probability distribution for the category by normalizing the number of occurrences of each attribute by the number of products in the similar product set (i.e. the size of the set). Another way of looking at this process is to say that the visually similar pre-labeled products "vote" on which attribute is applicable to the unlabeled product; the "vote" each casts is the attribute that it is labeled with in the category. The probability of each attribute is proportional to the "votes" it has received from products in the similar product set. To illustrate this process, consider the dress length category mentioned earlier that has the attributes "maxi", "mid-length", and "mini". Imagine the system discovers a set of 50 visually similar products in the pre-labeled product data 305, based on comparing the image data of the pre-labeled products with the image data of the unlabeled product. The system then determines the attribute labels for these 50 similar products; say that in this example 40 are labeled "maxi", 10 are labeled "mid-length", and 0 are labeled "mini". These totals are normalized by the size of the set (60) to give a probability distribution of [0.8, 0.2, 0.0]. This corresponds to a determination that the correct label is 80% likely to be "maxi", and 20% likely to be "mid-length".

The image classification-based generator 300D generates category probability distributions for a product using image classifiers that operate on an image of the product as input. The image classification-based generator 300D may process the image of the product in multiple stages to determine the product type, separate the product from its background, determine a relevant location in the image for processing, extract shape features, etc. Each of these stages may use different image processing techniques including distinct image classifiers.

Figure 7:
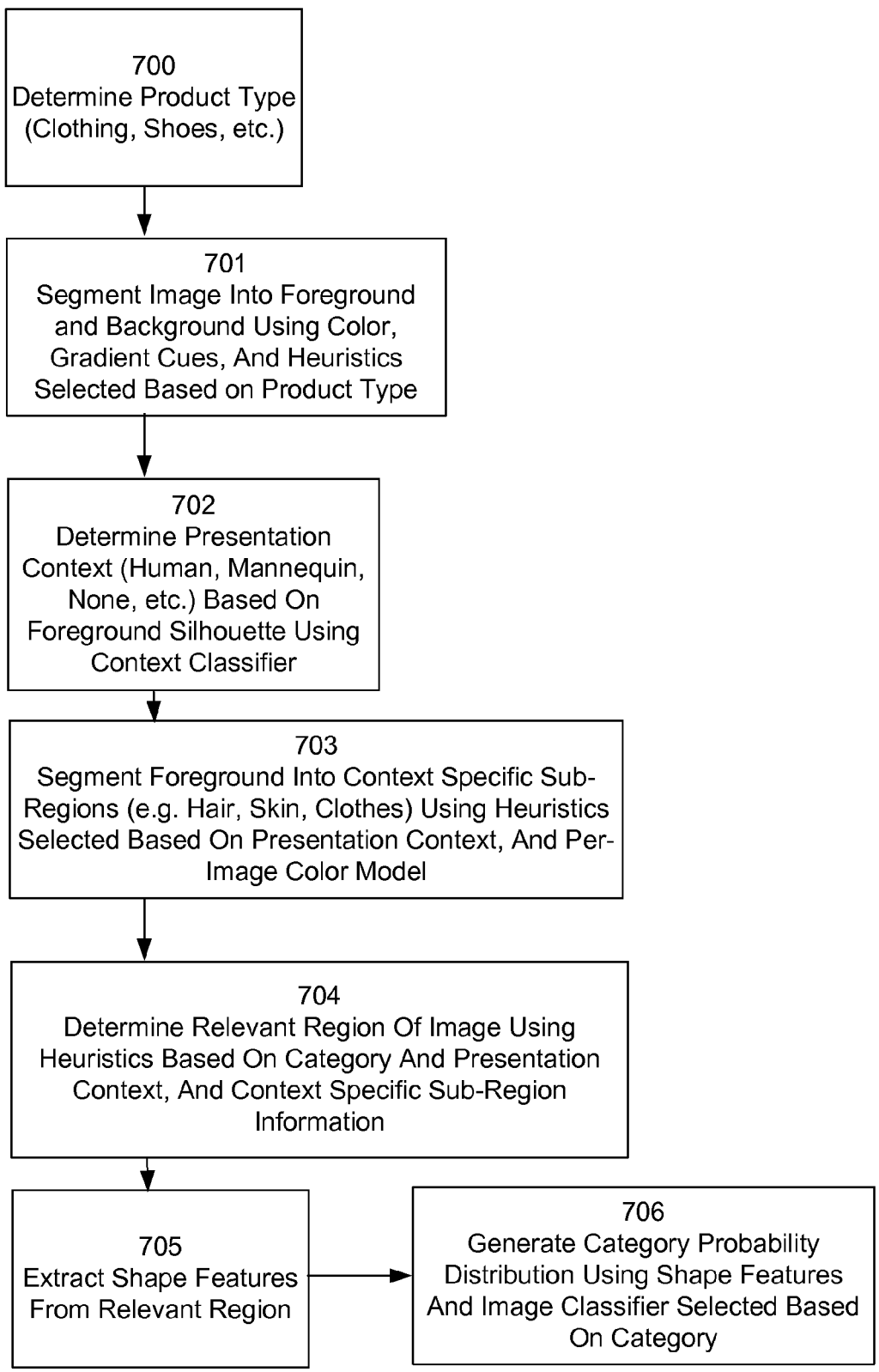
FIG. 7 is a flow chart illustrating the operation of the image-based classification generator according to one embodiment.

FIG. 7 illustrates one embodiment of a process used by the image classification-based generator 300D for generating a category probability distribution for a product based on an image. As a preliminary matter the generator 300D determines 700 the product type for which the category probability distribution is being generated. The product type may be pre-determined by an upstream process and provided to the image classification-based generator 300D, or the generator may determine the product type based on the output of a regular expression rule or text classifier applied to the product's text data. The product type (shoes, woman's dress, etc.) may often be determined based on a tag or description associated with the product.

Once the product type is determined, the generator segments 701 the product image into foreground (contains the product) and background regions (does not contain the product). In order to segment the image into foreground and background the generator 300D may use color and gradient cues as well as heuristics from the heuristics store 306 that are based on the product type. For example, based on the product type being shoe, the generator 300D may determine that the background color is a uniform single color (because shoes are often photographed in isolation against a uniform colored background), and based on this may further determine the background color, and thus segment the background and foreground regions.

For some products the foreground region will contain more than just the product. For example, for clothes, the foreground may contain both the product and a human model or mannequin that is wearing the clothes, or the foreground may be just the clothes laid out on a uniform background. For this reason the generator 300D will attempt to determine 702 the presentation context for the product (e.g. is the product presented on a human model, a mannequin, alone on a background, etc.). The presentation context may be determined based on analyzing the foreground region, the background region, or both. In one embodiment the presentation context is determined by measuring the pixel height of the foreground region at various points, normalizing these pixel heights by the total image pixel height and feeding this data into an image classifier, called a context classifier, to determine whether the foreground contains a mannequin, human model, or clothing alone. The context classifier may be trained to differentiate between different presentation contexts by training it on product images from the pre-labeled product data 305 that have been pre-sorted into "mannequin", "human model", and "clothing alone" images. In one embodiment, the context classifier is a linear SVM classifier.

Once the presentation context has been determined, the image classification-based generator 300D segments 703 the foreground region of the product image into further context-specific regions. For example, if the presentation context for a clothing product is a human model, the foreground region that contains both the clothing product and the human model may be further separated into regions for the hair, skin, and clothes. In another example, if the presentation context is clothing alone on a background, the foreground is just the clothing itself, and no further segmentation of the foreground is done. Similarly if the product is a shoe presented alone without a model, no further foreground segmentation is needed.

Figure 8:
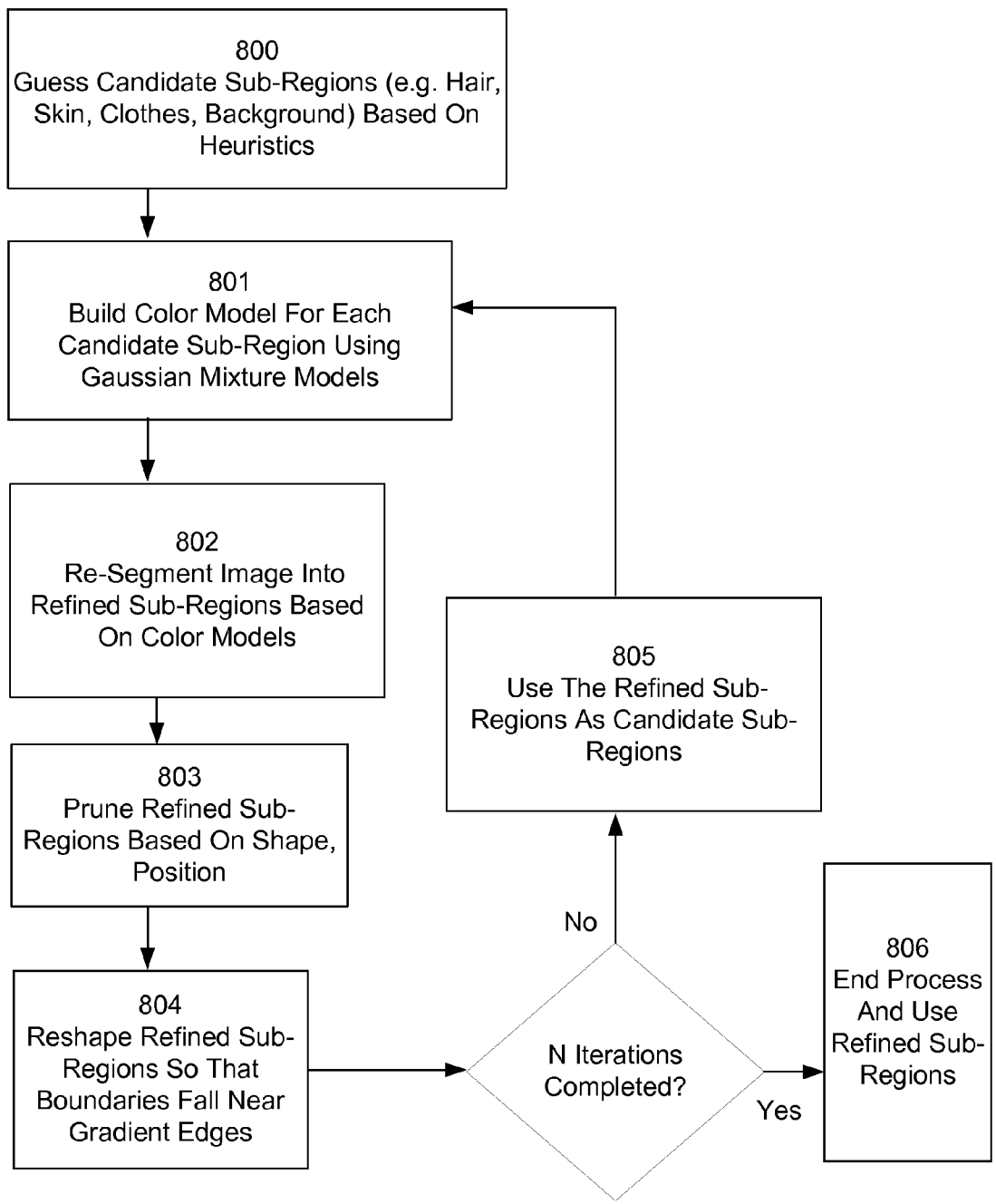
FIG. 8 is a flow chart illustrating the process of foreground segmentation performed by the image classification-based generator according to one embodiment.

The foreground segmentation may be done using many different image processing techniques. In one embodiment the foreground segmentation is done by building a color model for each relevant sub-region of the foreground (e.g. hair, skin, clothes in the case where the presentation context is a human model) as well as the background region. FIG. 8 illustrates one embodiment of a process for foreground segmentation. In this embodiment the generator 300D first makes a guess 800 about where the sub-regions (e.g. hair, skin, clothes) and background are in the image based on identifying pixels for each candidate sub-region and the background based on heuristics. These heuristics can make an initial guess based on, for example, likely skin color, likely hair color, position of sub-regions relative to the image or foreground, local smoothness of the region, etc. Uniform sampling in the background region and the foreground region may further help to identify regions of uniform color that may be placed into an initial guess for the foreground sub-regions or background region. Once these initial guesses are made, the generator builds 801 a color model for each candidate sub-region using Gaussian mixture models that are trained on the pixel color values from each guessed sub-region. These color models are then used to re-segment 802 the image into refined sub-regions and a refined background region. These new guesses for the sub-regions and background region are then pruned 803 based on further heuristics that enforce shape, continuity, and position rules on the pixels (e.g. skin pixels should not be scattered in the middle of the background region, but rather should be mostly clustered in within the foreground). The pruned regions are further reshaped 804 to make sure that the boundaries of the various sub-regions and background region fall near gradient edges. The process is then repeated for N times to iteratively improve the color models and segmentation accuracy. Each time the refined sub-regions are used 805 as the new candidate sub-regions. In one embodiment, a value for N is determined by experimenting with the images in the pre-labeled product data 305. In practice a value of 3 for N gives adequate results, but more or less iterations can be used before the process is ended 806 and the refined sub-regions used.

As illustrated in FIG. 7, once the foreground has been segmented into context specific sub-regions the image classification-based generator 300D will determine 704 a relevant region of the image for shape feature extraction. The relevant region is determined using heuristics based on the category and the presentation context, and the context specific sub-region information (e.g. location of hair, skin, clothes, etc.). The purpose of determining a relevant region of the image before shape feature extraction is to eliminate the influence of irrelevant features from the process. A relevant region of the product image is the region of the image that will likely contain the features that are pertinent to a particular category. For example, for the shoe toe type category used in earlier examples, the relevant region is the location of the product image that contains the toe of the shoe product. In the case of a shoe in a presentation context that is just the shoe on a background, the heuristic may discover the relevant region (i.e. the toe region) by first determining the orientation of the shoe based on the heights of the left side and right side of the foreground region (here the foreground is just the shoe), and the distribution of edge angles in the lower side of the convex hull of the foreground. Based on determining which side of the foreground is the front of the shoe, a sub-region of the foreground can be determined which contains the toe of the shoe. Similarly, the sub-regions for the heel or ankle of the shoe can also be determined. In another example, for clothes, location of skin, hair, and clothes, sub-regions can be used to determine the location of sub-regions relevant to categories that contain attributes describing dress length, neckline type, dress type, etc.

Once the relevant region of the image is determined, the generator 300D extracts 705 shape features from the relevant region. The shape features that are extracted may depend on the category for which the probability distribution is being generated. Depending on the category, the shape features can include contour features of the various sub-regions, shape features internal to the sub-regions, features incorporating special distribution of image features, etc. The category type can heavily influence the set of features that are extracted and used for that category. These features are only extracted for the parts of the sub-regions (foreground, hair, skin, clothes, etc.) that lie within the boundaries of the identified relevant region of the product image for that category. Examples of features that may be extracted and used are Pyramid of Histogram of Orientation Gradients (PHOG), described in Bosch, Zisserman, and Munoz, *Representing Shape With A Spatial Pyramid Kernel, CIVR* 2007, and speeded up robust features (SURF) described in Bay et al., *SURF: Speeded Up Robust Features, CVIU* 2008.

Finally, the shape features extracted from the relevant region of the product image are fed into a category-specific image classifier to generate 706 a category probability distribution for that category. The category-specific image classifier will be one that has been trained on pre-labeled product images from the pre-labeled product data 305, to generate a probability distribution for attributes in the category, based on the extracted features. In one embodiment the image classification-based generator 300D uses linear support vector machines (linear SVMs) as classifiers for the various categories. In another embodiment different types of classifiers may be used for different category types, based on the accuracy of the classifier types for the various categories.

Implementation

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for identifying known establishments in images. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method, comprising:
 receiving product data for a product, the product data comprising product image data for the product and product text data for the product, wherein the product is associated with a category, and wherein the category comprises a plurality of attributes;
 generating a plurality of individual probability distributions for the attributes based on the product data, wherein each individual probability distribution is generated using a different technique, wherein each individual probability distribution includes a respective individual probability for each of the attributes, and wherein the respective probability for each of the individual attributes represents a likelihood that the attribute is applicable to the product, wherein generating the plurality of individual probability distributions comprises:
  generating a first individual probability distribution using a first generator that determines probabilities based on the product image data, and
  generating a second individual probability distribution using a second generator that determines probabilities based on the product text data;
 generating a combined probability distribution for the attributes based on a weighted sum of the plurality of individual probability distributions, wherein the combined probability distribution comprises a respective combined probability for each of the attributes;
 selecting an attribute from the plurality of attributes having a highest combined probability; and
 associating an attribute label for the selected attribute with the product.

2. The method of claim 1, wherein generating the combined probability distribution comprises:
 weighting each of the individual probability distributions based on an accuracy of a generator used to generate the probability distribution.

3. The method of claim 1, wherein generating the second individual probability distribution comprises:
 generating the second individual probability distribution using a regular expression-based generator that determines probabilities based on application of regular expression rules to the product text data.

4. The method of claim 1, wherein generating the second individual probability distribution comprises:
 generating the second individual probability distribution using a text classification-based generator that determines probabilities based on text classifiers that take the product text data as input.

5. The method of claim 1, wherein generating the first individual probability distribution comprises:
 generating the first individual probability distribution using a visual label propagation-based generator that determines probabilities based on comparing the product image data with image data associated with pre-labeled products.

6. The method of claim 1, wherein generating the first individual probability distribution comprises:
 generating the first individual probability distribution using an image classification-based generator that determines probabilities using image classifiers that take the product image data as input.

7. The method of claim 6, wherein generating the first individual probability distribution using the image classification-based generator comprises:
 segmenting the product image data into a foreground region and a background region;
 determining a presentation context of the product within the product image data;
 segmenting the foreground region into sub-regions based on the presentation context;
 determining a relevant region of the product image data based on the category, the presentation context, and the sub-regions;
 extracting shape features from the relevant region of the product image data; and
 generating a probability distribution using the shape features and an image classifier selected based on the category.

8. The method of claim 7, wherein segmenting the foreground region into sub-regions comprises:
 guessing candidate sub-regions; building a color model for each candidate sub-region;
 and re-segmenting the product image into refined sub-regions based on the color models.

9. The method of claim 8, further comprising:
 iteratively segmenting the foreground regions into sub-regions, wherein the refined sub-regions are used as the candidate sub-regions in subsequent iterations.

10. A non-transitory computer-readable storage medium storing executable computer program instructions, the instructions executable to perform operations comprising:
 receiving product data for a product, the product data comprising product image data for the product and product text data for the product, wherein the product is associated with a category, and wherein the category comprises a plurality of attributes;
 generating a plurality of individual probability distributions for the attributes based on the product data, wherein each individual probability distribution is generated using a different technique, wherein each individual probability distribution includes a respective individual probability for each of the attributes, and wherein the respective probability for each of the individual attributes represents a likelihood that the attribute is applicable to the product, wherein generating the plurality of individual probability distributions comprises:
  generating a first individual probability distribution using a first generator that determines probabilities based on the product image data, and
  generating a second individual probability distribution using a second generator that determines probabilities based on the product text data;
 generating a combined probability distribution for the attributes based on a weighted sum of the plurality of individual probability distributions, wherein the combined probability distribution comprises a respective combined probability for each of the attributes;

selecting an attribute from the plurality of attributes having a highest combined probability; and associating an attribute label for the selected attribute with the product.

11. The computer readable medium of claim 10, wherein generating the combined probability distribution comprises:

weighting each of the individual probability distributions based on the accuracy of the generator used to generate the probability distribution.

12. The computer readable medium of claim 10, wherein generating the second individual probability distribution comprises:

generating the second individual probability distribution using a regular expression-based generator that determines probabilities based on application of regular expression rules to the product text data.

13. The computer readable medium of claim 10, wherein generating the second individual probability distribution comprises:

generating the second individual probability distribution using a text classification-based generator that determines probabilities based on text classifiers that take the product text data as input.

14. The computer readable medium of claim 10, wherein generating the first individual probability distribution comprises:

generating the first individual probability distribution using a visual label propagation-based generator that determines probabilities based on comparing the product image data with image data associated with pre-labeled products.

15. The computer readable medium of claim 10, wherein generating the first individual probability distribution comprises:

generating the first individual probability distribution using an image classification-based generator that determines probabilities using image classifiers that take the product image data as input.

16. The computer readable medium of claim 15, wherein generating the first individual probability distribution using the image classification-based generator comprises:

segmenting the product image data into a foreground region and a background region;

determining a presentation context;

segmenting the foreground region into sub-regions based on the presentation context;

determining a relevant region of the product image data based on the category, the presentation context, and the sub-regions;

extracting shape features from the relevant region of the product image data; and generating a probability distribution using the shape features and an image classifier selected based on the category.

17. The computer readable medium of claim 16, wherein segmenting the foreground region into sub-regions comprises:

guessing candidate sub-regions;

building a color model for each candidate sub-region;

re-segmenting the product image into refined sub-regions based on the color models; and pruning and reshaping the refined sub-regions.

18. The computer readable medium of claim 17 further comprising:

iteratively segmenting the foreground regions into sub-regions, wherein the refined sub-regions are used as the candidate sub-regions in subsequent iterations.

19. A system comprising:

one or more computers; and one or more storage devices storing executable computer program instructions that when executed by the one or more computers cause the one or more computers to perform operations comprising:

receiving product data for a product, the product data comprising product image data for the product and product text data for the product, wherein the product is associated with a category, and wherein the category comprises a plurality of attributes;

generating a plurality of individual probability distributions for the attributes based on the product data, wherein each individual probability distribution is generated using a different technique, wherein each individual probability distribution includes a respective individual probability for each of the attributes, and wherein the respective probability for each of the individual attributes represents a likelihood that the attribute is applicable to the product, wherein generating the plurality of individual probability distributions comprises:

generating a first individual probability distribution using a first generator that determines probabilities based on the product image data, and generating a second individual probability distribution using a second generator that determines probabilities based on the product text data;

generating a combined probability distribution for the attributes based on a weighted sum of the plurality of individual probability distributions, wherein the combined probability distribution comprises a respective combined probability for each of the attributes;

selecting an attribute from the plurality of attributes having a highest combined probability; and associating an attribute label for the selected attribute with the product.

20. The system of claim 19, wherein generating the combined probability distribution comprises:

weighting each of the individual probability distributions based on the accuracy of the generator used to generate the probability distribution.

21. The system of claim 19, wherein generating the second individual probability distribution comprises:

generating the second individual probability distribution using a regular expression-based generator that determines probabilities based on application of regular expression rules to the product text data.

22. The system of claim 19, wherein generating the second individual probability distribution comprises:

generating the second individual probability distribution using a text classification-based generator that determines probabilities based on text classifiers that take the product text data as input.

23. The system of claim 19, wherein generating the first individual probability distribution comprises:

generating the first individual probability distribution using a visual label propagation-based generator that determines probabilities based on comparing the product image data with image data associated with pre-labeled products.

24. The system of claim 19, wherein generating the first individual probability distribution comprises:
    generating the first individual probability distribution using an image classification-based generator that determines probabilities using image classifiers that take the product image data as input.

\* \* \* \* \*